Figure 1:
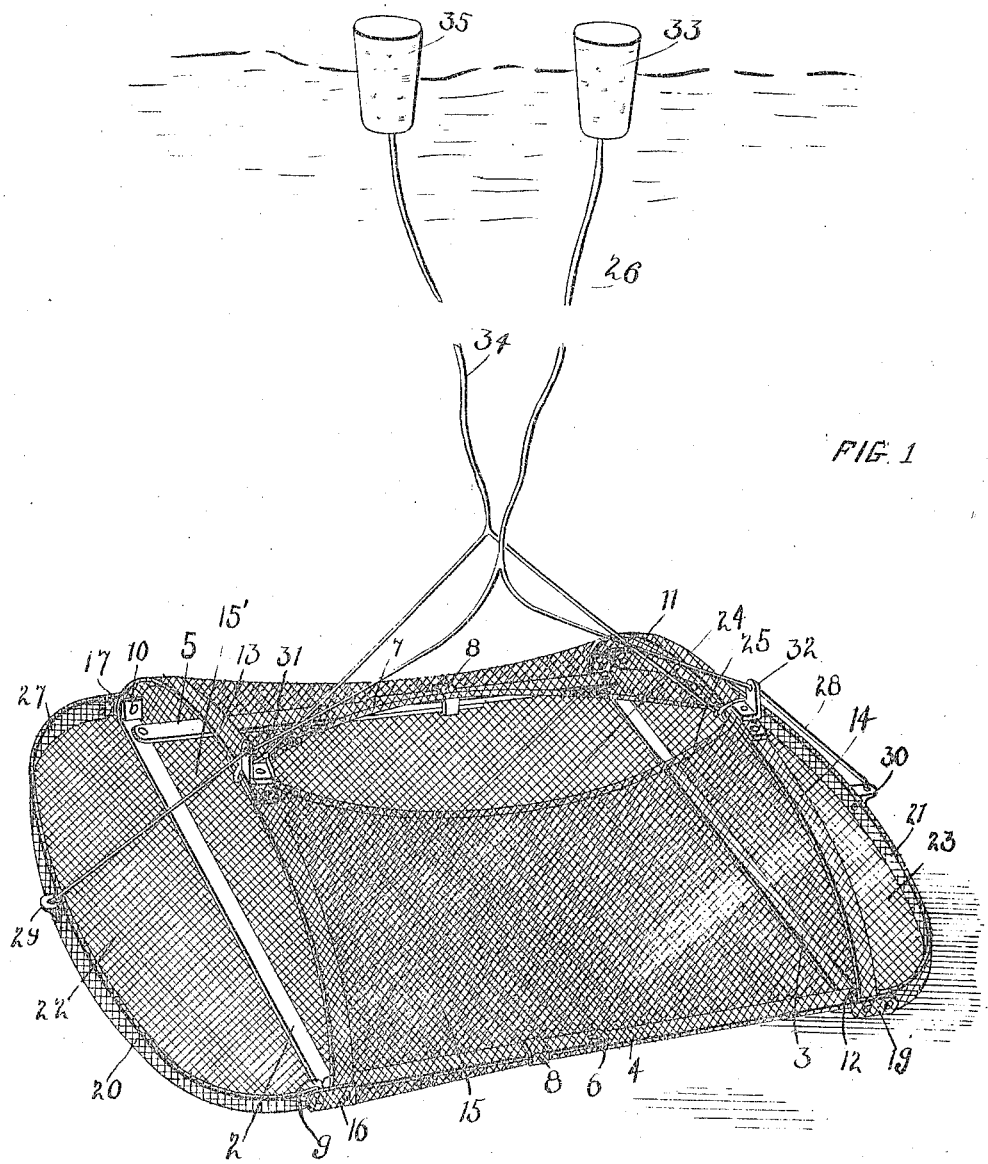

N. H. BUTCHER.
FISH TRAP.
APPLICATION FILED NOV. 21, 1914.

1,161,186.    Patented Nov. 23, 1915.
2 SHEETS—SHEET 1.

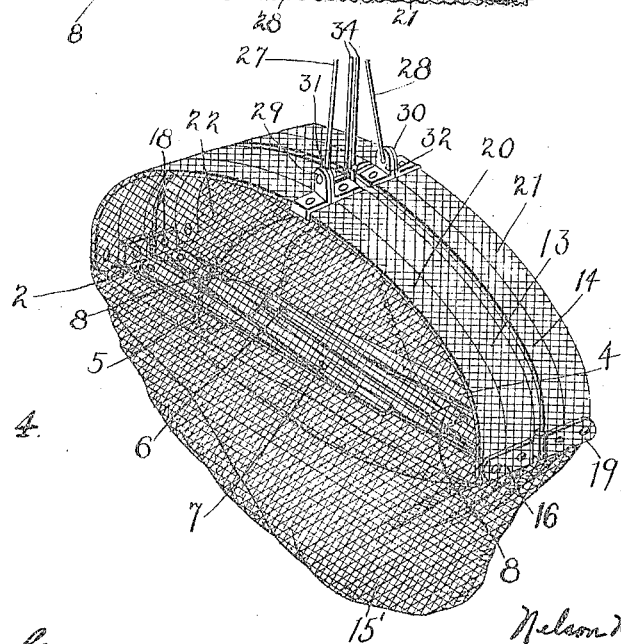

UNITED STATES PATENT OFFICE.

NELSON HENRY BUTCHER, OF DETROIT, MICHIGAN.

FISH-TRAP.

1,161,186.

Specification of Letters Patent.

Patented Nov. 23, 1915.

Application filed November 21, 1914. Serial No. 873,312.

*To all whom it may concern:*

Be it known that I, NELSON HENRY BUTCHER, citizen of the United States, residing at Detroit, in the county of Wayne and State of Michigan, have invented certain new and useful Improvements in Fish-Traps, of which the following is a specification.

My invention relates to new and useful improvements in fish traps and while especially adapted for the trapping of small fish such as minnows yet the same is capable of use when made upon a large scale for the catching of relatively larger fish.

The device is also intended for use as a live trap for the preservation of small fish for bait.

One of the objects of the present invention is to provide first a trap capable of being folded into such small compass that the same may be carried from place to place in a satchel or hand bag.

Another object is to provide a combined trap and live bait receptacle or container capable of being placed upon the bed of a stream or other body of water and provided with means floating upon the surface of the water for indicating the location thereof and operating the trap either to close the same and thus trap the fish or haul the trap to the surface or both as desired.

To provide a trap which while foldable into a small space yet will when unfolded or set up for operation be of a substantial nature and form a rigid structure.

Referring now to the drawings forming a part of this specification, Figure 1 is a top perspective view of the trap illustrating the same in extended position beneath the surface of the water in condition to receive the fish which enter to feed upon the bait placed therein; Fig. 2 is a central horizontal sectional view thereof; Fig. 3 is a central transverse section thereof, and Fig. 4 is a top perspective view of the trap when in folded condition and ready for packing.

Referring now to the drawings by numerals of reference, 1 indicates generally a main supporting structure which when the trap is in operative position as shown in Fig. 1 takes the form of a rectangular frame constituted by end metal plates or rods 2 and 3 and side longitudinal metal plates or rods 4 and 5 each of the latter being formed in two sections and hinged or pivoted together at 6 and 7 to permit the folding of the sections forming each side plate respectively longitudinally upon themselves as shown in Fig. 4. One of the sections of each side member is extended beyond its pivotal connection with the other section and coöperates with a sliding yoke or sleeve 8 upon said latter section to hold its respective side member in extended position. The longitudinal side plates 4 and 5 in addition to the centrally located pivotal connections 6 and 7 are provided at their outer ends with pivotal connections 9, 10, 11 and 12 with the end plates 2 and 3 to facilitate the folding of the main supporting frame structure. Rigidly connected with each of the end plates 2 and 3 or preferably integral therewith is a metallic bowed or arched upright plate 13 and 14 coperating with the side and end frame plates to support or stretch a netting or mesh 15 and 15' forming the top and bottom of the trap.

Pivotally secured to each of the upright plates 13 and 14 through the medium of rigid bosses 16, 17, 18 and 19 secured to the said upright plates 13 and 14 is a bowed or arched metal plate 20 and 21 respectively, said plates conforming in outline and general contour to the upright bowed plates to which they are hinged the function of which features is to provide a tight joint between the meeting edges of the adjacent bowed plates when the trap is closed thus effectually preventing the scale or even the smallest fish caught within the trap. Netting or mesh 22 and 23 is also stretched over the plates 20 and 21 respectively and bound to the edges thereof in a suitable manner.

The top netting or mesh of the trap is provided with a longitudinal central opening 24, the netting adjacent the opening being reinforced or formed by rolling the netting upon itself as at 25, the walls forming the opening being spaced apart at the central longitudinal portion of the trap and converging toward their ends. For the purpose of closing the trap before hauling the laths, I provide a draw rope or cord 26, divided at its lower portion into two lengths of cord 27 and 28 the terminal portions of which are connected to the central longitudinal portion of the pivoted end bowed plates 20 and 21 respectively by eyelets or other fastening devices 29 and 30. Guides 31 and 32 are rigidly secured to the central longitudinal portion of the upright bows 13 and 14 and guide the cords 27 and 28 as they pass therethrough when the end pivoted bows 22 and 23 are closed by pull exerted upon the draw rope 26. A float 33 is attached to the free or upper end of the cord 26 to indicate the location of the latter and may be of a distinctive color to distinguish the draw or trap closing from the haul line 34 the latter being also supported at the surface of the water by a cork or float 35. The corks or floats 33 and 35 may be of very light weight as for example of sufficient buoyancy to merely support the weight of the cords 26 and 34, the net resting as shown in Fig. 1 on the bed of the stream or body of water. On the other hand the float 35 may be of sufficient buoyancy to support the entire weight of the net at any distance beneath the surface of the water and above the bed of the stream, the float 33 being merely for the purpose of indicating the location of the trap closing cord 26.

The operation of my trap is extremely simple and may be briefly described as follows: The trap in its operative or extended position as shown in Fig. 1, is lowered into the water, bait of a desired nature first having been placed on the netting or mesh 15'. The corks 33 and 35 will then float upon the surface of the water and indicate the location of the trap and the operating cords. Fish may then enter the trap to feed upon the bait at the open ends and through the top opening 24. A person or attendant now wishing to trap the fish will pull upon the cord 26 causing the pivoted end bowed plates 20 and 21 over which the mesh is stretched to fold simultaneously against the rigid upright bowed plates 13 and 14 and preventing the escape of the fish at the ends of the trap. The attendant now exerts a pull on the haul cord 34 at the same time keeping the cord 26 taut and lifts the trap to the surface of the water to remove the fish caught therein. The operation may be repeated by opening the ends and lowering the baited trap.

The trap is capable of being folded by sliding the sleeves 8 from over the extensions forming a part of one section of each side member respectively and bending the joints 6 and 7 inwardly as shown in Fig. 4 which also shows the entire structure in folded position ready for packing or shipping.

Having thus described my invention, what I claim and desire to protect by Letters Patent is:

1. A fish trap comprising a main frame having rigid end members, side members collapsible centrally of their length, and a pivoted or hinged member secured to each of said rigid end members and means for operating said pivoted or hinged members.

2. A fish trap comprising a frame having rigid end members, sectional and centrally foldable side members, and a hinged member mounted upon each of said rigid end members and means for operating said hinged end members.

3. A fish trap comprising a frame having end members, collapsible side members foldable midway of their length, a netting or mesh stretched over the frame formed by said end and side members, an end member pivoted to each of said end frame members, and means for moving said pivoted end members into parallel relation with said end frame members to close the trap.

4. A fish trap comprising a frame having arched or bowed end members, and sectional and centrally pivoted side members, and means for locking said sectional and pivoted side members in extended position to provide a substantially rectangular frame structure and a netting or mesh stretched on and supported by said frame members.

5. A frame for a fish trap comprising parallel vertical end members having a horizontal base portion and an arched or bowed upper portion, sectional side members, each consisting of a rod jointed centrally of its length having its end portions pivoted to said end members, an arched or bowed member pivoted to each of said end members and capable of folding into parallel relation therewith, and means for simultaneously operating said pivoted arched members.

6. A fish trap comprising a frame having parallel vertical end members having a horizontal base portion and an arched upper portion, side members foldable midway of their length connecting said end members, said end and side members constituting a frame for supporting and stretching a netting or mesh, arched end members pivotally secured to the frame end members and conforming in outline at the arched portions to the arched or bowed end frame members, a netting or mesh stretched over said pivoted end members, means for simultaneously swinging said pivoted end members to close the trap and means secured to the frame structure for raising the trap from the water in which it is placed.

In testimony whereof I affix my signature in presence of two witnesses.

NELSON HENRY BUTCHER.

Witnesses:
   J. A. WALSH,
   E. A. EISMAN.